Patented Jan. 2, 1951

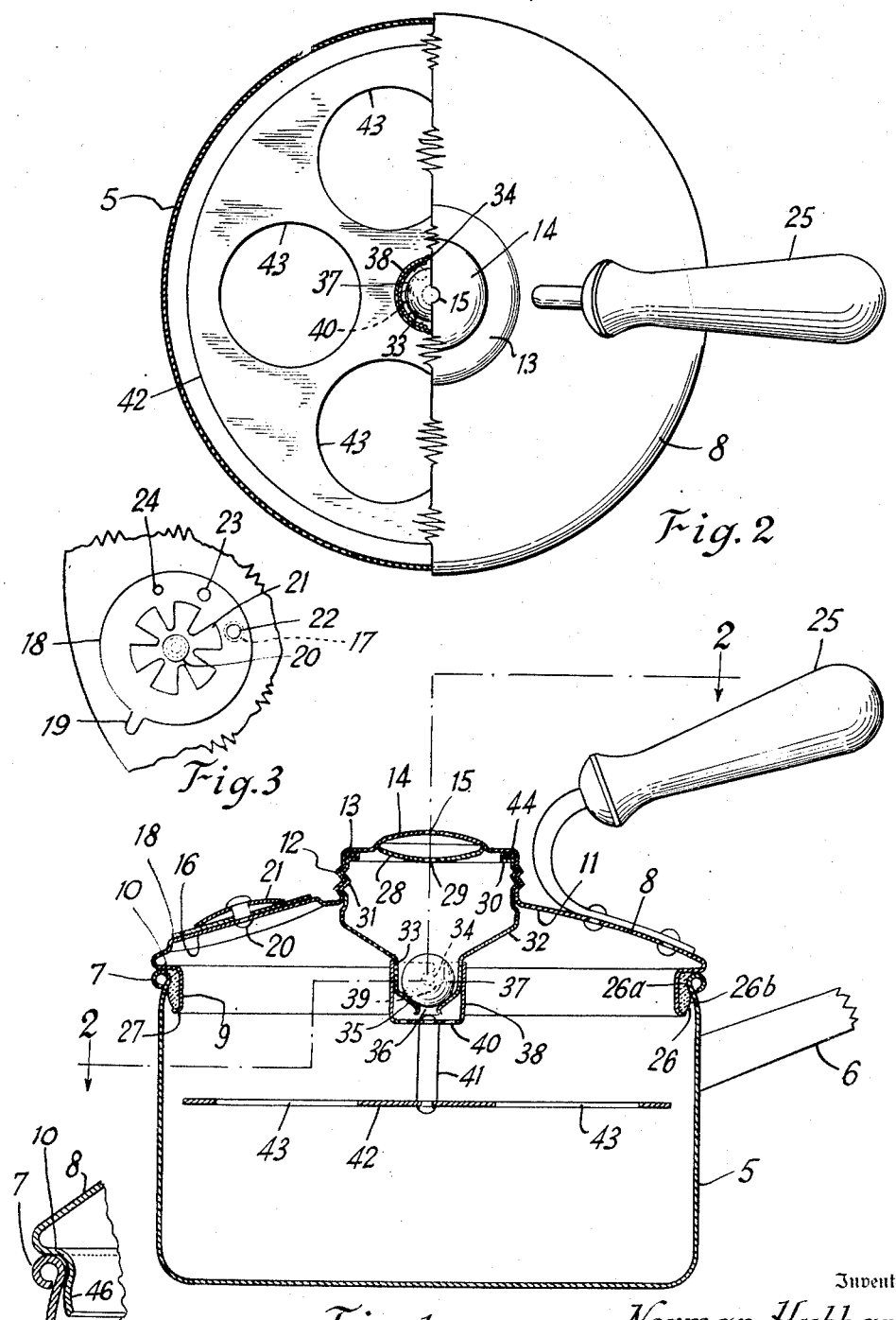

2,536,369

UNITED STATES PATENT OFFICE 2,536,369

COOKING VESSEL WITH AUDIBLE SIGNAL

Norman Hubbard, Akron, Ohio

Application October 16, 1946, Serial No. 703,662

4 Claims. (Cl. 126—388)

My invention relates to the construction of cooking utensils, particularly a cooking vessel of the type adapted for cooking articles of food by boiling.

The general object of my invention is the provision of a covered vessel or pot suitable for cooking foods, wherein vapor generated therein is used to audibly signal the termination of a selectively predetermined time period of boiling.

Another object of my invention is to provide a closed pot having a joint between the lid and the pot which is tight against an internal vapor pressure corresponding to the load imposed by the manual effort of forcing the lid into a closing position on the pot.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is a sectional elevation of a cooking pot constructed in accordance with my invention;

Fig. 2 is a plan view partly in section taken on line 2—2 of Fig. 1;

Fig. 3 is a top view in direct projection of a timing register; and

Fig. 4 is an enlarged sectional elevation of an alternate joint of a pot and a lid.

In the embodiment illustrated in the drawing, a substantially cylindrical metallic vessel or pot 5 is provided with a handle 6 and a tubular lip ring 7 of inside diameter less than the pot 5. The upper end of the pot is closed by a removable metallic lid 8 comprising a straight cylindrical flange 9 depending from a flat horizontal flanged portion 10, a spherical body portion 11, an upwardly projecting threaded cylindrical portion 12, a flat horizontal annular portion 13, and a spheral portion 14 having a small port or hole 15; all the parts of the lid being concentric with the vertical axis of the pot.

At one side of part 12 the spheral body 11 has a raised flat circular portion 16 formed with a port or hole 17. Concentric with the flat circular portion 16 and in close contact with the outer surface thereof is a flat disc 18. The disc has a radially projecting ear 19 and is held in close revolvable contact with the outer surface of the flat circular portion 16 of the lid by a spring washer 21 and a shoulder rivet 20. The disc 18 is perforated with a plurality of angularly spaced holes 22, 23, 24 of successively varying area and having their centers the same distance from the axis of the disc as the port 17, so that the holes can be moved so as to be concentric with the port 17. The lid is provided with an inclined handle 25.

A compressible gasket 26 extends around the depending flange 9 of the lid, and is secured to the lid by a crimped out portion 27 of the lower edge of the flange. The gasket 26 is corrugated circumferentially on its outer surface, forming a circular concave groove 26$^a$ above and a circular convex bead 26$^b$ below. The outside diameter of the convex bead 26$^b$ is somewhat greater than the inside diameter of the pot lip ring 7 so that when the gasket 26 is compressed in a forced passage through the pot lip ring 7, it will attempt to expand to normal form, making a joint of the lid with the pot tight against internal pressure proportional to the human effort exerted in forcing the lid to its pot closing position.

Within the lid and opposed to the spheral portion 14 thereof is mounted a similar spheral member 28 provided with an axial port or hole 29, which in conjunction with the perforated spheral portion 14, forms a conventional "tin whistle."

The lid portions 13 and 28 form the top of a valve chamber, the remaining walls of which are defined by a flat horizontal annular flange 30, a depending threaded cylindrical portion 31 adapted to screw into the threaded portion 12 of the lid, an inverted frusto-conical portion 32 terminating in a straight cylindrical depending portion 33 provided with diametrically opposite external nodes 34, a frusto-conical portion 35, and a port 36 open to the interior of the pot. Seated upon the inside of the conical portion 35 is a pop valve 37 which normally closes off the valve chamber from the interior of the pot.

A closed end cylinder 38, adapted to snugly fit the outside of the cylindrical portion 33 of the valve chamber, is provided with a pair of oppositely arranged L-shaped slots 39 adapted to engage the nodes 34 in a bayonet type joint. The bottom of the cylinder 38 is perforated with a plurality of ports 40 connecting the interior of the pot with the port 36. The cylinder 38 has a depending axial support 41 for a detachable horizontal circular plate rack 42 provided with a plurality of holes 43 for the reception of articles to be boiled, for example, eggs. A gasket 44 seals the junction of the flange 30 of the intermediate chamber member and the flat portion 13 of the lid.

In operation the disc 18 is revolved to align one of the holes 22, 23 or 24 with the port 17. The pot is filled with a boiling vaporizable liquid, preferably water, to a level subjacent the bottom of the cylinder 38. The articles to be cooked are placed in position in the rack 42 and the lid is inserted into the mouth of the pot and forced to a tight seat in the lip ring. The pot is heated, or continued to be heated, at a predetermined rate of steam generation and a portion of the steam being generated in the pot, proportional to the area of the hole 22, 23, or 24 then aligned with the port 17, escapes to the atmosphere during a corresponding definite time period, until the rising steam pressure within the pot equals the load imposed by the pop valve 37 upon its seat in the cone 35. Valve 37 then rises, allowing steam to escape through the whistle ports 29 and 15 to sound an audible alarm. The desired time period for boiling the articles is selectively determined by aligning a corresponding hole of the series 22, 23, 24 with port 17; if a smaller hole of the series is aligned with port 17, a shorter time will elapse, and if a larger hole of the series is aligned with hole 17, a longer time will elapse before the whistle blows. The lid with its attached rack and articles is then removed from the pot.

As shown in Fig. 4, the flange 9 of the lid can alternately be made of ogee contour in section, as indicated at 46, and its convex portion of greater diameter than the inside diameter of the lip ring 7. In being forced through the pot lip ring 7, the flange 46 is compressed within its elastic limit, and in expanding toward normal after passing through the lip ring, tends to draw the horizontal flange 10 into forced contact with the top of the lip ring 7, making a tight contact of the lid with the pot at two points simultaneously.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A cooking vessel comprising a pot and a lid having a vapor-tight joint with said pot, a vapor escape port in said lid, a movable register having a plurality of holes of different area therein arranged for selective alignment with said escape port to vary the effective vapor flow area thereof, means in said lid forming a whistle operable by escaping vapor, and a pop valve arranged to control the flow of vapor to said whistle means.

2. A cooking utensil comprising a pot, a lid adapted to fit the pot steamtight against internal pressure, means forming an intermediate chamber depending from the inside of the lid and normally closed from interior of the pot by a pop valve and open to the atmosphere through a whistle, and a revolvable register mounted on the lid and containing a plurality of ports of successively varying area adapted to be aligned with a master escape port in the lid to form means allowing the escape of a greater or less amount of steam to vary the time required to generate sufficient pressure to raise the pop valve and sound the whistle to signify the termination of a predetermined time period of cooking by boiling.

3. A cooking vessel comprising a pot and a lid having a vapor-tight joint with said pot, a vapor escape port in said lid, an upwardly projecting lid central section having oppositely arranged perforated spheral portions in the top thereof forming a whistle, a depending tubular member arranged to fit into said lid central section and form therewith a valve chamber open at its lower end, a pop valve normally closing the lower end of said valve member and proportioned to lift on a predetermined rise in vapor pressure in said vessel, and means for selectively varying the size of said escape port to control the rate of rise of vapor pressure in said vessel.

4. A cooking vessel comprising a pot and a lid having a vapor-tight joint with said pot, a vapor escape port in said lid, an upwardly projecting threaded lid central section having oppositely arranged perforated spheral portions in the top thereof forming a whistle, a downwardly tapering threaded tubular member arranged to fit into and be supported from said lid central section and form therewith a valve chamber open at its lower end, a pop valve normally closing the lower end of said valve chamber and proportioned to lift on a predetermined rise in vapor pressure in said vessel, and a movable register on said lid arranged for selectively varying the size of said escape port to control the rate of rise of vapor pressure in said vessel.

NORMAN HUBBARD.

REFERENCES CITED

The following references are of record in the file of this patent:

UNITED STATES PATENTS

| Number | Name | Date |
|---|---|---|
| 50,169 | Sargeant | Sept. 26, 1865 |
| 437,706 | Mathias | Oct. 7, 1890 |
| 578,059 | Hallas | Mar. 2, 1897 |
| 848,816 | Duerr | Apr. 2, 1907 |
| 875,310 | Ayer | Dec. 31, 1907 |
| 1,328,001 | Kinsman | Jan. 13, 1920 |
| 1,340,566 | Seidl | May 18, 1920 |
| 1,701,384 | McGarvey | Feb. 5, 1929 |
| 1,727,075 | McGarvey | Sept. 3, 1929 |
| 2,192,600 | Lurtz | Mar. 5, 1940 |

FOREIGN PATENTS

| Number | Country | Date |
|---|---|---|
| 3,083 | Great Britain | of 1889 |
| 5,856 | Great Britain | of 1915 |
| 191,560 | Germany | Nov. 18, 1907 |
| 400,709 | Great Britain | Nov. 2, 1933 |
| 623,237 | France | Mar. 15, 1927 |